United States Patent
Bhat et al.

(10) Patent No.: US 8,132,165 B2
(45) Date of Patent: Mar. 6, 2012

(54) INTERCEPTION PROXY-BASED APPROACH FOR IN-SERVICE SOFTWARE UPGRADE

(75) Inventors: Kong Posh Bhat, Plano, TX (US); Michael David Hall, Carrollton, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1320 days.

(21) Appl. No.: 11/754,181

(22) Filed: May 25, 2007

(65) Prior Publication Data

US 2008/0295088 A1  Nov. 27, 2008

(51) Int. Cl.
*G06F 9/44* (2006.01)
(52) U.S. Cl. .................................. 717/170; 717/168
(58) Field of Classification Search ........... 717/168–178
See application file for complete search history.

(56) References Cited

U.S. PATENT DOCUMENTS

| | | | | |
|---|---|---|---|---|
| 5,274,808 A * | 12/1993 | Miyao et al. | | 717/168 |
| 5,410,703 A * | 4/1995 | Nilsson et al. | | 717/168 |
| 6,070,012 A * | 5/2000 | Eitner et al. | | 717/168 |
| 6,385,770 B1 * | 5/2002 | Sinander | | 717/170 |
| 6,397,385 B1 | 5/2002 | Kravitz | | |
| 6,463,142 B1 * | 10/2002 | Kilp | | 379/201.06 |
| 6,535,924 B1 * | 3/2003 | Kwok et al. | | 709/242 |
| 6,950,878 B2 * | 9/2005 | Kwok et al. | | 709/242 |
| 7,065,769 B1 * | 6/2006 | Tolopka | | 719/321 |
| 7,373,632 B1 * | 5/2008 | Kawaguchi et al. | | 717/100 |
| 7,657,899 B2 * | 2/2010 | Werner | | 719/330 |
| 7,802,245 B2 * | 9/2010 | Sonnier et al. | | 717/171 |
| 7,930,691 B2 * | 4/2011 | Bhattacharya et al. | | 717/171 |
| 2003/0055926 A1 * | 3/2003 | Kwok et al. | | 709/221 |
| 2003/0176165 A1 * | 9/2003 | Gosewehr | | 455/9 |
| 2003/0177209 A1 * | 9/2003 | Kwok et al. | | 709/221 |
| 2005/0182763 A1 * | 8/2005 | Chang | | 707/4 |
| 2005/0198022 A1 * | 9/2005 | Chang | | 707/4 |
| 2006/0206905 A1 * | 9/2006 | Werner | | 719/330 |
| 2007/0169083 A1 * | 7/2007 | Penubolu et al. | | 717/168 |

* cited by examiner

*Primary Examiner* — Anna Deng
*Assistant Examiner* — Qing Chen

(57) ABSTRACT

A system for an in-service software upgrade is disclosed. The system consists of a processor, a first version of a software process, a second version of the software process, and a proxy software process. When executed by the processor, the proxy software process can intercept a message intended for the first version and direct the message to either the first version or the second version based on the status of a transaction associated with the message.

19 Claims, 6 Drawing Sheets

INTERCEPTION PROXY-BASED APPROACH FOR IN-SERVICE SOFTWARE UPGRADE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software may be upgraded when new features need to be added to the software, when a database schema used by the software changes, when a process architecture used by the software changes, or for numerous other reasons. One method of performing a software upgrade is simply to shut down any equipment using an older version of the software, install a newer version, and restart the equipment. However, such an upgrade procedure may not be acceptable for software installed in high-reliability systems such as telecommunications switching equipment. To prevent service outages, such systems typically cannot be shut down for the length of time necessary to perform an upgrade in this manner.

For a high-reliability system, hardware and software redundancy may be in place, wherein two substantially identical sets of hardware and software operate simultaneously. This redundancy improves the reliability of the system since one set of hardware and software can continue to operate if the other fails. When a software upgrade is to be performed on a redundant system, a new version of the software can be installed on a first set of hardware while a second set of hardware continues to execute the old version. When the installation of the new version on the first set of hardware is complete, the new version can then be installed on the second set of hardware. In this way, software can be upgraded without any interruption in service. However, this procedure only applies to redundant systems, which can be expensive and difficult to operate and maintain.

SUMMARY

In one embodiment, a system for an in-service software upgrade is provided. The system includes a processor, a first version of a software process, a second version of the software process, and a proxy software process. When executed by the processor, the proxy software process can intercept a message intended for the first version and direct the message to either the first version or the second version based on the status of a transaction associated with the message.

In another embodiment, a method for upgrading software is provided. The method includes executing a first version and a second version of the software substantially simultaneously during an upgrade process. A proxy intercepts a message intended for the first version. The proxy directs the message to the first version when a transaction associated with the message is an old transaction that was already in progress at a time when the second version began execution. The proxy directs the message to the second version when the transaction associated with the message is a new transaction that was begun after the time the second version began execution.

In another embodiment, a network element in a wireless telecommunications network is provided. The network element includes a processor, a first version of a software application, and a proxy software process. The proxy software process, when executed by the processor, can intercept a message intended for the first version and, based on a status of a transaction associated with the message, can direct the message to either the first version or a second version of the software application.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In an embodiment, an in-service software upgrade approach is provided. During the upgrade process, an older version and a newer version of the software that is being upgraded operate simultaneously. A proxy application is provided during the upgrade process to intercept messages intended for the software. The proxy application can determine whether a message should be sent to the older version or the newer version of the software and can then forward the message to the appropriate version. When messages no longer need to be sent to the older version of the software, the proxy application and the older version can be removed and all messages can be sent to the newer version. In this way, software can be upgraded without shutting down the equipment on which the software executes and without the need for redundant equipment. Since the older and newer versions of the software operate simultaneously only during the short period of time when the upgrade is in progress, long term software bloat is prevented.

While the in-service software upgrade approach does not require redundant equipment, it might be used on either redundant or non-redundant systems. On a non-redundant system, the expense of operating two substantially identical sets of equipment is avoided. On a redundant system, software can be upgraded without temporarily taking one of the substantially identical sets of equipment out of service.

Figure 1A:
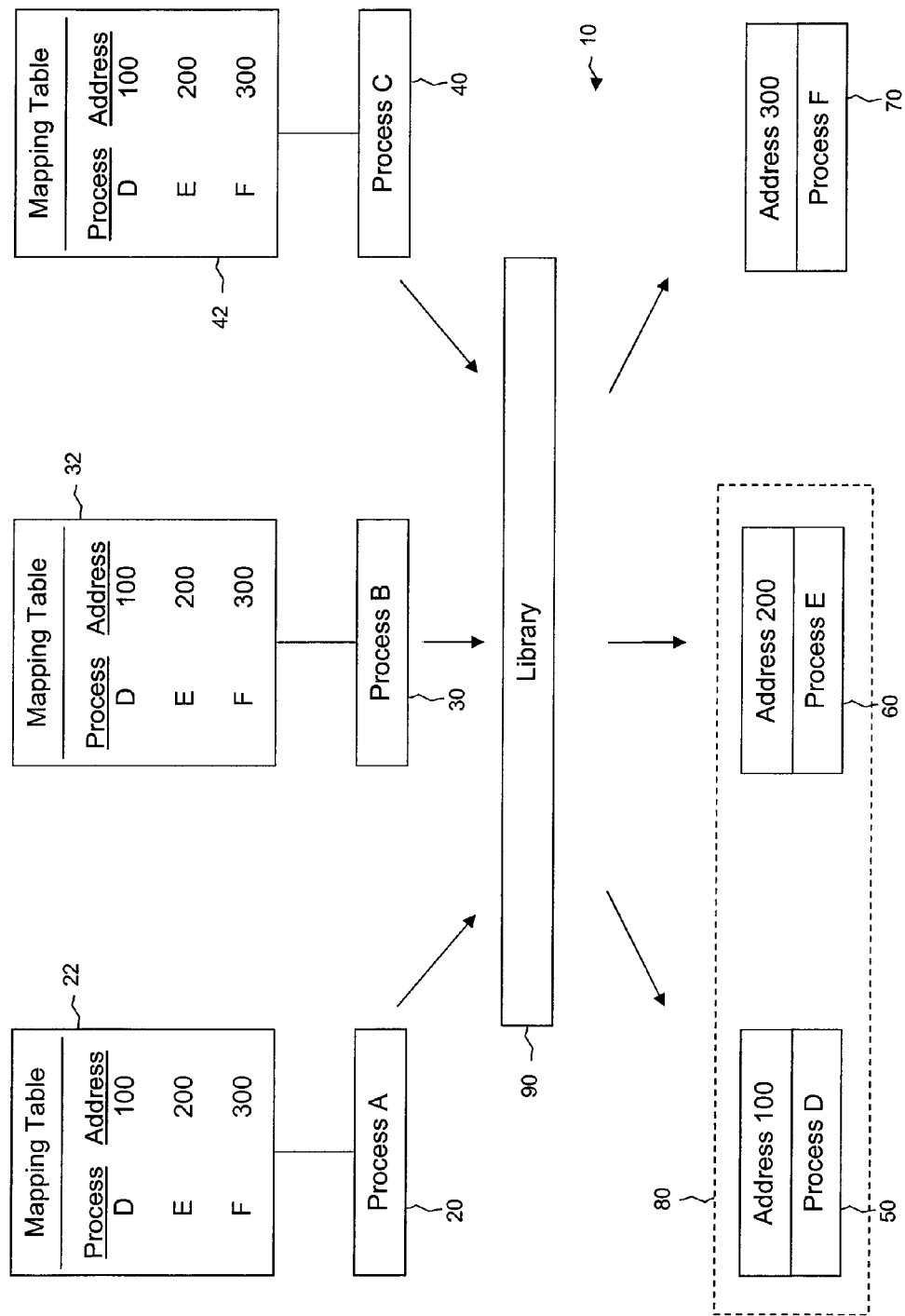
FIG. 1a is a block diagram of a plurality of processes prior to an in-service upgrade according to an embodiment of the disclosure.

FIG. 1a illustrates a system 10 that might be a portion of the software system on a piece of high-reliability equipment. The equipment might be a switch, a base station controller, a router, or some other network element in a wireless telecommunications network. The equipment might also be a portion of an air traffic control system, a medical system, or some other type of system in which high reliability and a minimum of downtime are desired. The system 10 includes a plurality of processes: process A 20, process B 30, process C 40, process D 50, process E 60, and process F 70. In other embodiments, other numbers of processes might be present. The processes might be applications, subroutines within an application, or other forms of software that might need to be upgraded. The processing done by the processes might be the processing of telephone calls in a telecommunications network or the conducting of some other type of transaction in some other type of equipment.

In this example, process D 50 and process E 60 are related processes that need to be upgraded together. Therefore, process D 50 and process E 60 form a set that can be referred to as an upgrade set 80. In other embodiments, the upgrade set 80 could contain more than two processes or only one process. In this example, process F 70 is not being upgraded and therefore is not included in the upgrade set 80.

Process A 20, process B 30, and process C 40 are processes that might need to send messages to process D 50, process E 60, and/or process F 70. In general, any of the processes in the system 10 could send messages to any of the other processes in the system 10. However, to better illustrate the upgrade procedure for process D 50 and process E 60, only messages that are sent from either process A 20, process B 30, or process C 40 to either process D 50, process E 60, or process F 70 will be considered in this discussion. The messages could be any type of call from one process to another well known to those skilled in the art.

As is well known in the art, a system of interacting processes might be linked to a library to facilitate communication between the processes. The library might act as a wrapper to mediate different types of messages sent by different types of processes. The library might also be used to create one or more mapping tables that specify the transport addresses of the processes, where a transport address might include an Internet Protocol (IP) address and a port number or some other well known designation for the location of a process. In some cases, each process might create its own customized mapping table based on information stored in the library. In other cases, the library might maintain a mapping table that is used by all of the processes.

Such a library 90 is illustrated in FIG. 1a. For ease of reference, the library 90 is depicted in FIGS. 1a, 1b, 1c, and 2 and is discussed herein as if the library 90 is an independent entity. However, one of skill in the art will recognize that the library 90 is actually linked into the processes and runs within the context of the processes.

In one embodiment, the library 90 might contain a master list of all processes in the system 10 and the addresses of those processes. Each process might then create its own customized mapping table based on the information in the library 90. In the example of FIG. 1a, process A 20 has created a mapping table 22, process B 30 has created a mapping table 32, and process C 40 has created a mapping table 42. Only the addresses of process D 50, process E 60, and process F 70 are shown in the mapping tables of FIG. 1a, but additional processes and addresses might be present. Also, process D 50, process E 60, and process F 70 might have their own mapping tables but these mapping tables are not shown in FIG. 1a. In another embodiment, the library 90 might contain a mapping table that includes the names and addresses of the processes in the system 10 and the processes might make use of this central mapping table, rather than their individualized mapping tables, when sending messages to one another. Other techniques for mapping processes to addresses will be well known to those of skill in the art.

Regardless of the mapping technique, the business logic portion of process A 20, process B 30, or process C 40 need not be concerned with the address of another process to which it is sending a message. The business logic can simply specify the process to which the message is to be sent and the library 90 and/or one of the mapping tables 22, 32, or 42 can ensure that the message reaches the appropriate destination. If the address of the destination should change, only the library 90 and/or the mapping table 22, 32, or 42 needs to be updated; no modifications may need to be made to the business logic portion of process A 20, process B 30, or process C 40.

In the example of FIG. 1a, if process A 20, for instance, wishes to send a message to process D 50, for instance, the business logic portion of process A 20 merely needs to specify that the message is to be sent to process D 50. Process A 20 might then consult its internal mapping table 22 to determine that the address of process D 50 is 100. Process A 20 might then send the message with the address of process D 50 to the library 90. The library 90 might then act as a wrapper to mediate the transfer of the message from process A 20 to process D 50. In other cases, the message might be sent to the library 90 with only the name of the process D 50 to which it is being sent. The library 90 might then find in its mapping table that the current address of process D 50 is 100 and the library 90 might then forward the message to address 100. In still other cases, process A 20 might consult the library 90 to obtain the address of process D 50 and might then send the message directly to process D 50 without sending the message through the library 90. In any of these situations, the destination of the message might be included in the message header.

Figure 1B:
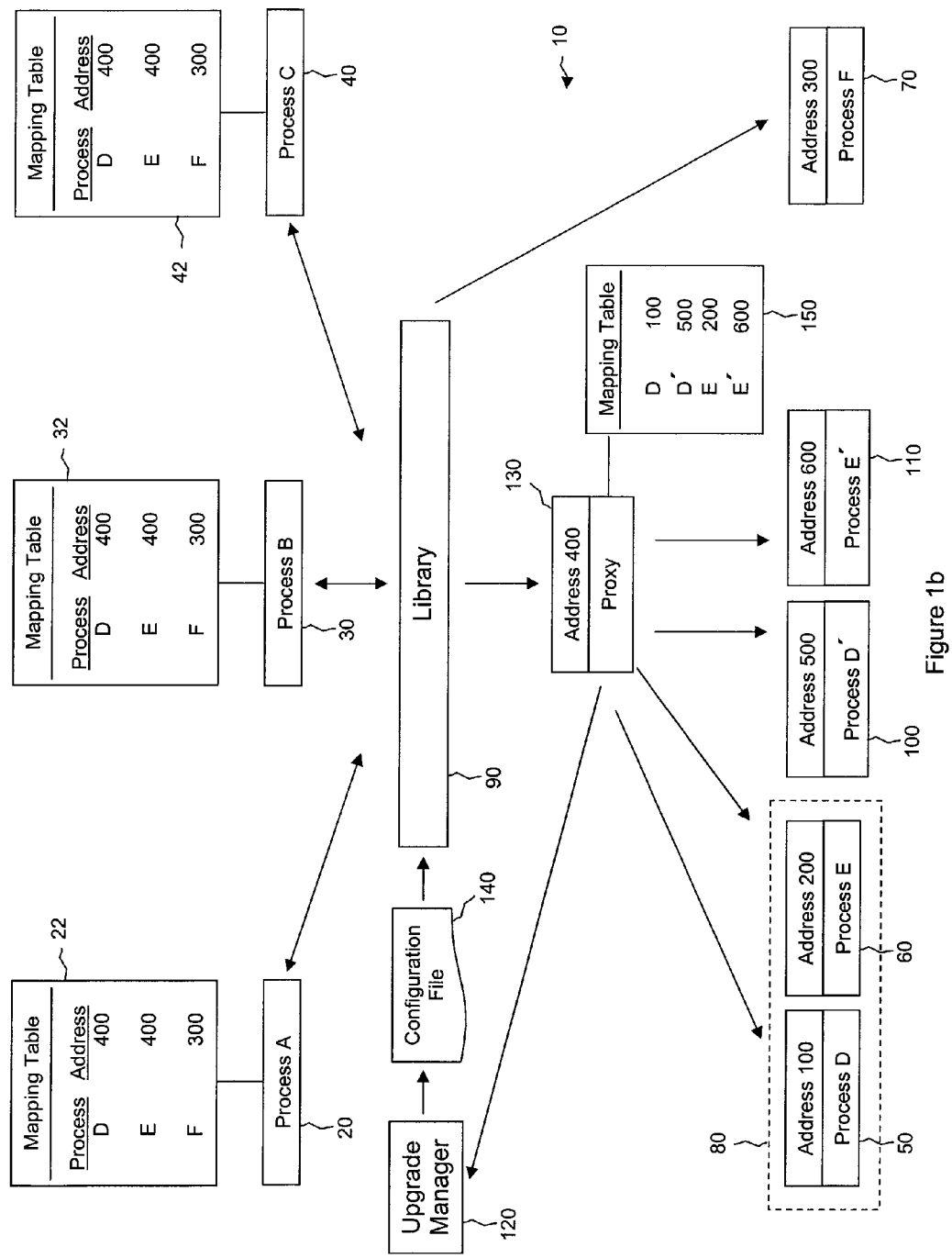
FIG. 1b is a block diagram of the plurality of processes during an in-service upgrade according to an embodiment of the disclosure.

FIG. 1b illustrates an embodiment of the system 10 as an in-service upgrade of process D 50 and process E 60 takes place. In this embodiment, process D 50 is being replaced by an upgraded process D' 100 and process E 60 is being replaced by an upgraded process E' 110. In other embodiments, other processes could be included in the upgrade set 80. Also, in other embodiments, the number of processes that replace the processes in the upgrade set 80 could be different from the number of process in the upgrade set 80. For example, a single process might replace both process D 50 and process E 60, or one or more processes in addition to process D' 100 and process E' 110 might replace process D 50 and process E 60.

The in-service upgrade procedure is carried out by a set of software-based components that are temporarily installed on the system 10. One of the components is an upgrade manager 120, which initiates and controls the in-service upgrade. Another of the components is a proxy 130, which directs messages to the appropriate processes during the upgrade.

Other components that might be installed on the system 10 to facilitate the upgrade will be described below and are not shown in FIG. 1b.

In an embodiment, when an in-service upgrade is to occur, an upgrade configuration file 140 is created that contains information related to the upgrade. The upgrade configuration file 140 might include the names and addresses of the processes to be upgraded, the names and addresses of the processes that will replace the processes being upgraded, the address of the proxy 130, a list of any data stores that might be used by the processes to be upgraded, information that might aid the synchronization of newer and older versions of the data stores, and other information that might be needed to carry out the upgrade.

In an embodiment, the upgrade manager 120 sends the upgrade configuration file 140 to the library 90. The upgrade manager 120 also causes the library 90 to move from its normal state to an upgrade state. In the normal state, the library 90 passes all messages to their specified destinations. In the upgrade state, the library 90, based on information in the upgrade configuration file 140, sends messages destined for processes in the upgrade set 80 to the proxy 130.

In the embodiment of FIG. 1b, the mapping tables 22, 32, and 42 have consulted the library 90 to use the information from the upgrade configuration file 140 to update the addresses to which messages are to be sent. Specifically, the addresses of the processes in the upgrade set 80, process D 50 and process E 60 in this case, have been changed to the address of the proxy 130. In this way, any messages that are intended for the processes in the upgrade set 80 will instead be sent to the proxy 130. The addresses of the processes that are not in the upgrade set 80 are left unchanged so that messages sent to those processes will reach their intended destination without passing through the proxy 130. The intended destinations of the messages can be included in the message header.

This is illustrated in FIG. 1b, where the proxy 130 is shown with an address of 400 and the addresses of process D 50 and process E 60 in the mapping tables 22, 32, and 42 have been changed to 400. Process F 70, which is not in the upgrade set 80, still has the address that it had previously. Now, any message that process A 20, process B 30, or process C 40 sends to process D 50 or process E 60 will be redirected to the proxy 130. Any message that process A 20, process B 30, or process C 40 sends to process F 70 will still be sent, via the library 90, to process F 70.

In another embodiment, the library 90 uses the information in the upgrade configuration file 140 to update its internal mapping table and the mapping tables 22, 32, and 42 of process A 20, process B 30, and process C 40 are not changed. Process A 20, process B 30, and process C 40 send messages based on the addresses in their mapping tables 22, 32, and 42, and the mapping table in the library 90 maps these addresses to the address of the proxy 130 as appropriate.

In an embodiment, the proxy 130 has the capability to use the information in the library 90, including the information provided by the upgrade configuration file 140, to create its own mapping table 150. The proxy's mapping table 150 includes the addresses of the processes that are in the upgrade set 80 as well as the addresses of the processes that will replace the processes that are in the upgrade set 80. In the example of FIG. 1b, it can be seen that the proxy's mapping table 150 includes the previously known addresses of process D 50 and process E 60 (addresses 100 and 200, respectively) as well as the addresses of process D' 100 and process E' 110 (addresses 500 and 600, respectively) as determined from the upgrade configuration file 140.

The proxy 130 can send a message that it receives from the library 90 to either an older version of a process, process D 50 for example, or a newer version of that process, process D' 100 for example. In an embodiment, the decision on which version of a process a message should be sent to is based on the status of a transaction associated with the message. Any transaction that was begun after the time an in-service upgrade began can be referred to as a new transaction. Any transaction that was in progress at the time an in-service upgrade began can be referred to as an old transaction. In an embodiment, an old transaction might be a call that was in progress when the in-service upgrade began and a new transaction might be a call that began after the in-service upgrade began.

New transactions can typically be carried out by the new version of a process. Old transactions, however, typically need to be completed by the old version of a process. That is, the version of a process that began a transaction typically needs to complete that transaction. Therefore, in one embodiment, any message related to a new transaction can be sent to the new version of a process, but any message related to an old transaction is sent to the old version of that process. In other embodiments, other relationships may exist.

In an embodiment, messages that are transmitted within the system 10 contain a transaction indicator field in the message header that indicates the status of the transaction that the message is related to. The transaction indicator might specify whether the transaction is a new transaction or an old transaction. That is, the transaction indicator might indicate whether the transaction has just begun or is an ongoing or existing transaction. The proxy 130 is able to read these message headers upon receiving outbound messages from the library 90 and determine the status of the transaction that the message is related to. Using this header information and the proxy's mapping table 150, the proxy 130 is able to determine the appropriate destination for the messages that it receives.

For example, if process A 20 were conducting a transaction with process D 50 at the time that an in-service upgrade began, the transaction would typically need to be completed by process D 50. Therefore, any messages related to the transaction would need to be sent to process D 50 rather than to process D' 100. If process A 20 sent a message to process D 50 after the in-service upgrade began, process A 20 would consult its mapping table 22 and find that all messages destined for process D 50 are to be sent to address 400, the address of the proxy 130. The message would be intercepted by the library 90 and the library 90 would then forward the message to the proxy 130. By examining the message header, the proxy 130 would determine that the message was originally intended for process D 50 and that the message is related to an old transaction. Combining these two pieces of information, the proxy 130 would then determine that the message should be sent to the old version of process D 50. Consulting its mapping table 150, the proxy 130 would then find the address of the old version of process D 50, address 100, and send the message to that address.

As another example, process C 40 might begin a transaction with process E 60 after an in-service upgrade has begun. Such a transaction could be carried out by the newer version of process E 60, namely process E' 110. Therefore, any messages related to the transaction could to be sent to process E' 110 rather than to process E 60. Process C 40 would be oblivious to the fact that an upgrade was in progress and would continue to send messages to process E 60 as it previously had. Process C 40 would consult its mapping table 42 and find that all messages destined for process E 60 are to be sent to address 400, the address of the proxy 130. A message that process C 40 sends to process E 60 would be intercepted by the library 90 and the library 90 would then forward the message to the proxy 130. By examining the message header, the proxy 130 would determine that the message was originally intended for process E 60 and that the message is related to a new transaction. Combining these two pieces of information, the proxy 130 would then determine that the message should be sent to the new version of process E 60, namely process E' 110. Consulting its mapping table 150, the proxy 130 would then find that the address of the new version of process E 60, namely process E' 110, is address 600, and would send the message to that address.

As yet another example, process B 30 might wish to send a message to process F 70 while an in-service upgrade is in progress. Upon consulting its mapping table 32, process B 30 would find that the address associated with process F 70 is 300. That is, since process F 70 is in not in the upgrade set 80, its address has not been temporarily changed to the address of the proxy 130. The message would not go through the proxy 130 and would be sent, via the library 90, directly to process F 70 as it would be if the in-service upgrade were not in progress.

In this way, when software is to be upgraded, an older version and a newer version of the software can execute simultaneously. Messages sent to the software are intercepted by the proxy 130 and the proxy 130 sends to the older version any messages related to transactions that need to be completed by the older version. All other messages are sent to the newer version. Messages not related to the software being upgraded are sent to their original destinations. When messages related to transactions that need to be completed by the older version are no longer being sent, the older version of the software can be removed and all messages can be sent to the newer version.

In an embodiment, when the proxy 130 has not received an old transaction for a predefined length of time, it can be assumed that there are no pending transactions and the in-service upgrade can be considered complete. The upgrade configuration file 140 can contain this time parameter and, when the upgrade configuration file 140 is passed to the library 90, the proxy 130 can read this time parameter from the library 90. When the proxy 130 determines that it has not received an old transaction for a time period greater than this time parameter, the proxy 130 can send a message to the upgrade manager 120 informing the upgrade manager 120 of that fact. The upgrade manager 120 can then begin moving the system 10 into a post-upgrade state.

When the upgrade manager 120 receives the message from the proxy 130 indicating that the upgrade is complete, the upgrade manager 120 can forcibly terminate the proxy and remove the proxy 130 and the proxy's mapping table 150 from the system 10. The upgrade manager 120 can also remove the old versions of the software that has been updated. In the embodiment of FIG. 1*b*, process D 50 and process E 60 would be removed. In addition, the upgrade manager 120 can update the mapping tables 22, 32, and 42, and/or the library 90 to reflect the addresses of the new versions of the software. In the embodiment of FIG. 1*b*, the mapping tables 22, 32, and 42, and/or the library 90 would be updated with the addresses of process D' 100 and process E' 110, namely addresses 500 and 600. The upgrade manager 120 can also remove itself from the system 10. By taking these steps, the upgrade manager 120 places the system 10 into the post-upgrade state and the system 10 can resume normal operations with the updated software in place.

Figure 1C:
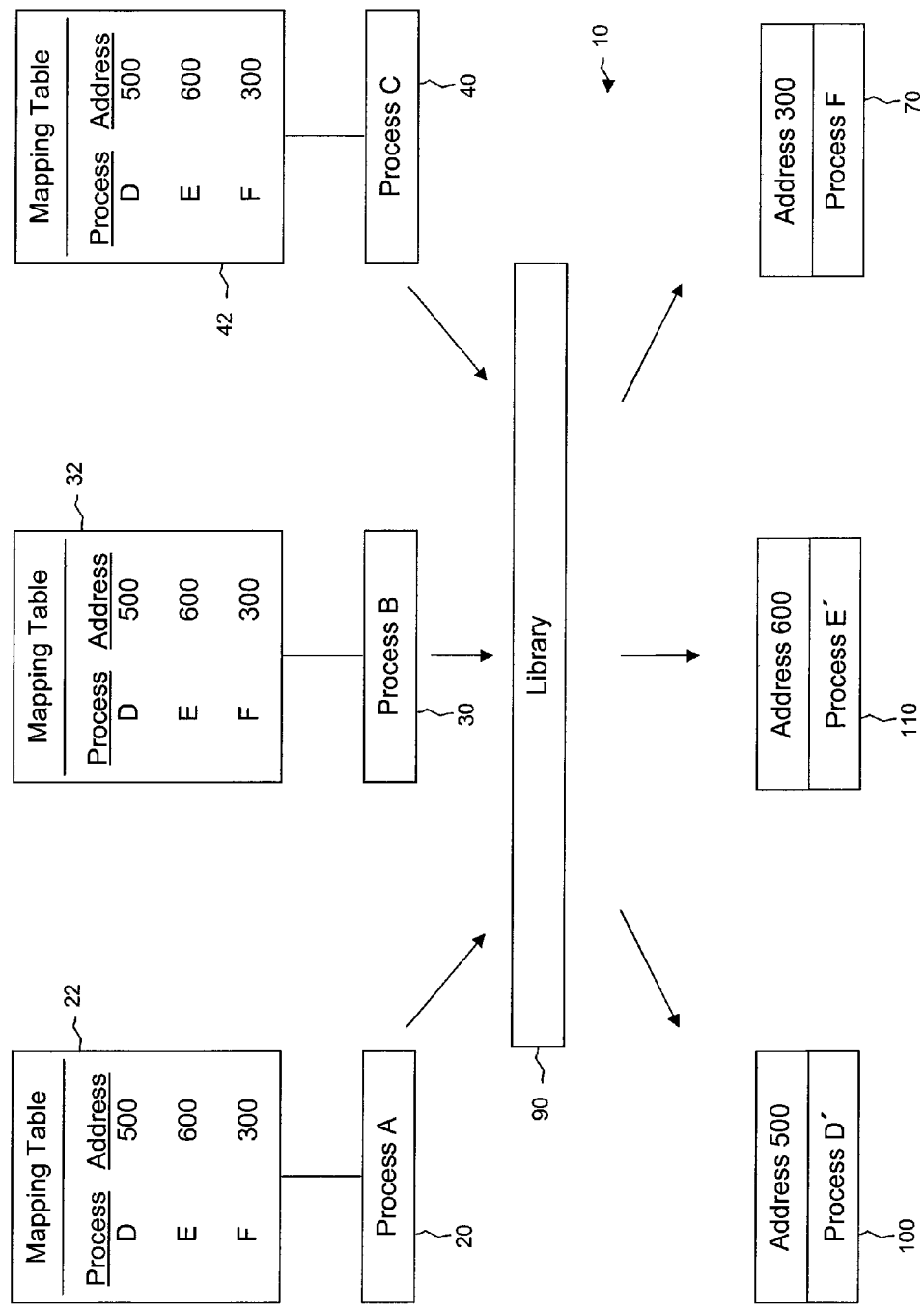
FIG. 1c is a block diagram of the plurality of processes after an in-service upgrade according to an embodiment of the disclosure.

The post-upgrade state is illustrated in FIG. 1*c*. It can be seen that the upgrade manager 120, the proxy 130, the proxy's mapping table 150, process D 50, and process E 60 have been removed from the system 10. The address of process D 50 in the mapping tables 22, 32, and 42 has been changed to the address of process D' 100 and the address of process E 60 has been changed to the address of process E' 110. Now, when process A 20, process B 30, or process C 40 sends a message to process D 50 or process E 60, the modified mapping tables 22, 32, and 42 will cause the message to be sent to address 500 or address 600, respectively, the addresses of the new versions of processes D 50 and E 60. In this way, process D' 100 can replace process D 50 and process E' 110 can replace process E 60 and the other processes in the system 10 can be oblivious to the change.

One or more processes in the system 10 might communicate with a database or a similar data store. In some cases, a process in an upgrade set or a process replacing a process in an upgrade set might make modifications to the data in a database while an in-service upgrade is in progress. Also, the schema of the data in a database might be changed while an in-service upgrade is in progress. For example, data fields might be added to a data element or the size of a field in a data element might change. In such cases, a synchronization may need to occur to ensure that the newer version of the process and the older version of the process have access to the same data in the same format.

Figure 2:
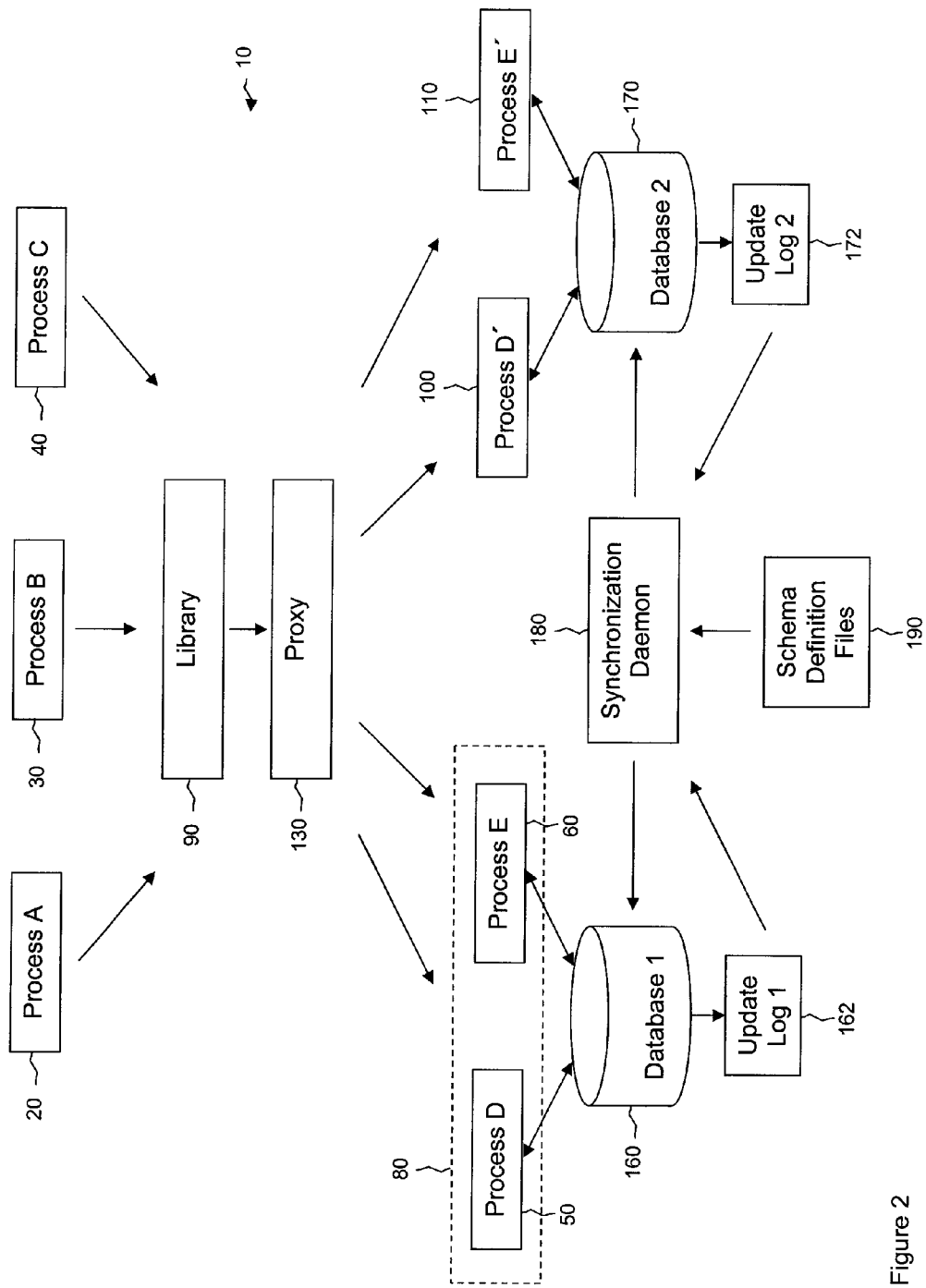
FIG. 2 is a block diagram of the plurality of processes in communication with a plurality of databases according to an embodiment of the disclosure.

FIG. 2 illustrates an embodiment of the system 10 in which an in-service upgrade, similar to the upgrade depicted in FIG. 1*b*, is in progress. The system 10 includes a database, referred to here as database 1 160, shared by the two processes in the upgrade set 80, process D 50 and process E 60. In other embodiments, additional processes might share database 1 160 or only one of process D 50 or process E 60 might use database 1 160. Process D' 100 and process E' 110, the processes that will replace process D 50 and process E 60, also share a database, referred to here as database 2 170.

In an embodiment, any modifications that are made to the data in database 1 160 are recorded in update log 1 162 and any modifications that are made to the data in database 2 170 are recorded in update log 2 172. A synchronization daemon 180 can retrieve update records from update log 1 162 and update log 2 172. The synchronization daemon 180 can also retrieve data from one or more schema definition files 190. The schema definition files 190 can describe the data schemas used by database 1 160 and database 2 170. For example, the schema definition files 190 might contain information about the data field names and data field sizes in database 1 160 and database 2 170. The schema definition files 190 can also describe the conversion rules for converting data from one schema to another. For example, if a data field is added to a data element or if the size of a data field changes in database 1 160, the schema definition files 190 can specify how a corresponding change should occur in database 2 170.

The synchronization daemon 180 can use the information retrieved from update log 1 162, update log 2 172, and the schema definition files 190 to synchronize database 1 160 and database 2 170. The synchronization can occur at periodic intervals during an in-service upgrade. For example, if a data element in database 1 160 is modified, when the next synchronization event occurs the synchronization daemon 180 can learn of the modification and can cause a similar modification in database 2 170. In this way, when an in-service upgrade is successfully completed, database 2 170 can be substituted for database 1 160 and process D' 100 and process E' 110 can use database 2 170 in a similar manner to the use of database 1 160 by process D 50 and process E 60.

050 The synchronization daemon 180 can also ensure that an appropriate back-out occurs when an in-service upgrade does not complete successfully. For example, if an in-service upgrade fails, process D' 100 and process E' 110 might need to be removed from the system 10 and database 1 160 might need to be returned to the state it was in prior to the attempt at the in-service upgrade. The synchronization daemon 180 can retrieve data from update log 1 162, update log 2 172, and the schema definition files 190 and use the data to reverse any changes that were made to database 1 160 and return database 1 160 to its previous state.

It should be recognized that update log 1 162, update log 2 172, and the synchronization daemon 180 will be present in the system 10 only when the system 10 is in the upgrade state. When an in-service upgrade is complete, logging of data update transactions can stop and update log 1 162, update log 2 172, and the synchronization daemon 180 can be removed from the system 10. Together with the removal of process D 50, process E 60, the upgrade manager 120, the proxy 130, and the proxy's mapping table 150 discussed above, this places the system 10 in the post-upgrade state of FIG. 1*c*.

While the previous discussion has focused on the single upgrade set 80 in the system 10, it should be understood that a plurality of upgrade sets might be present in a system such as the system 10. When multiple sets of related processes that need to be upgraded together are present, each set could comprise a separate upgrade set. When a software upgrade is to occur, a separate proxy will typically be installed for each upgrade set. A single upgrade manager might initiate and control all of the in-service upgrades or a separate upgrade manager might be associated with each proxy.

Also, while the above discussion has focused on a single piece of equipment that includes a plurality of processes, it should be recognized that other configurations are possible. For example, the system 10 could be distributed across multiple pieces of equipment in multiple physical locations. The upgrade set 80 might be located on a first network element in a first location, for instance, and process D' 100, process E' 110, and any other processes that might replace the upgrade set 80 might be located on one or more other network elements in one or more other locations. As another example, the upgrade manager 120 might be located on a first network element and might control multiple in-service upgrades on multiple other network elements in multiple locations. Other suitable configurations of the components in the system 10 should be apparent to one of skill in the art.

Figure 3:
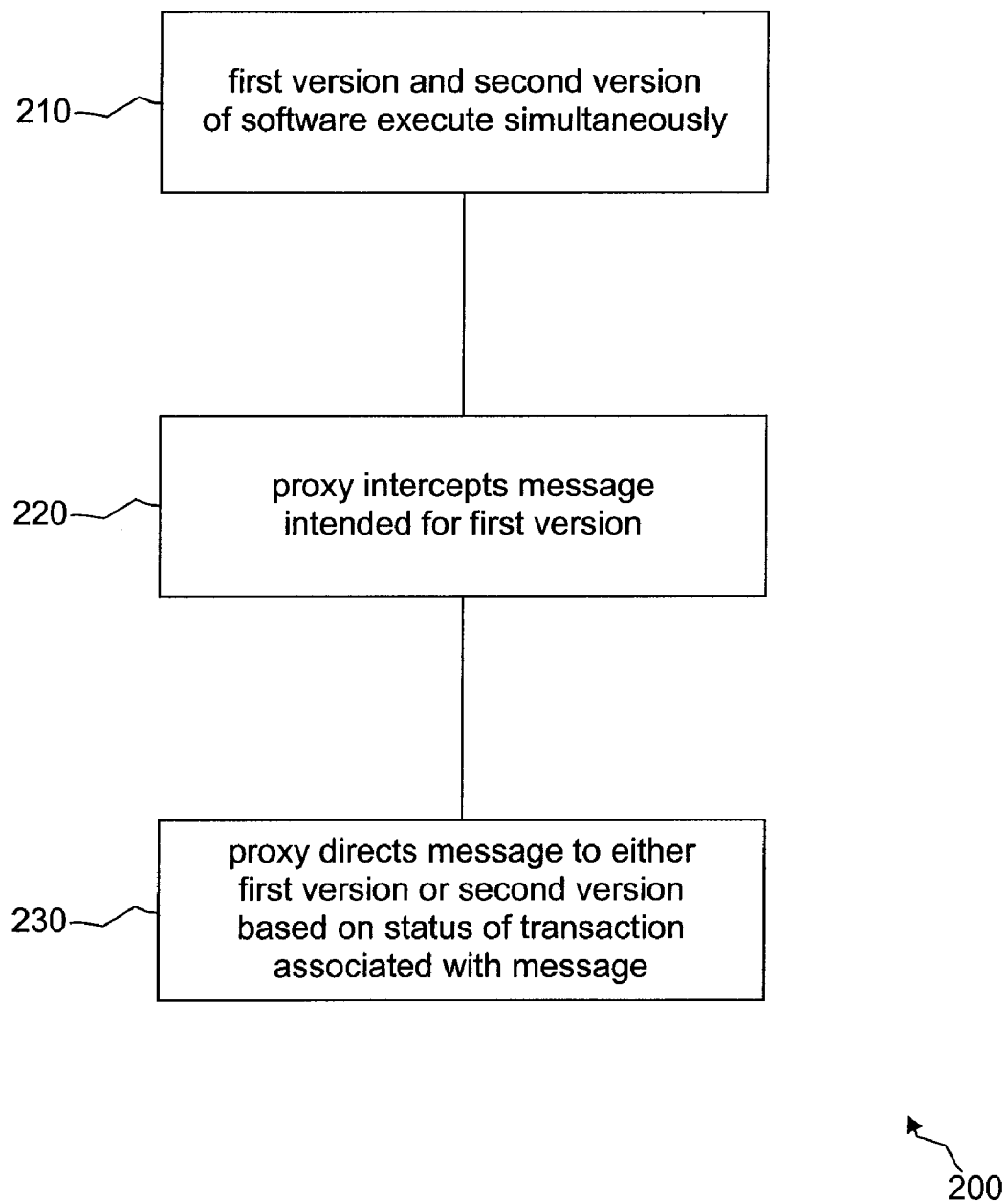
FIG. 3 is a block diagram of a method for upgrading software according to an embodiment of the disclosure.

FIG. 3 illustrates an embodiment of a method 200 for upgrading software. At block 210, a first version and a second version of the software execute simultaneously. At block 220, a proxy intercepts a message intended for the first version. At block 230, the proxy directs the message to either the first version or the second version based on the status of a transaction associated with the message.

Figure 4:
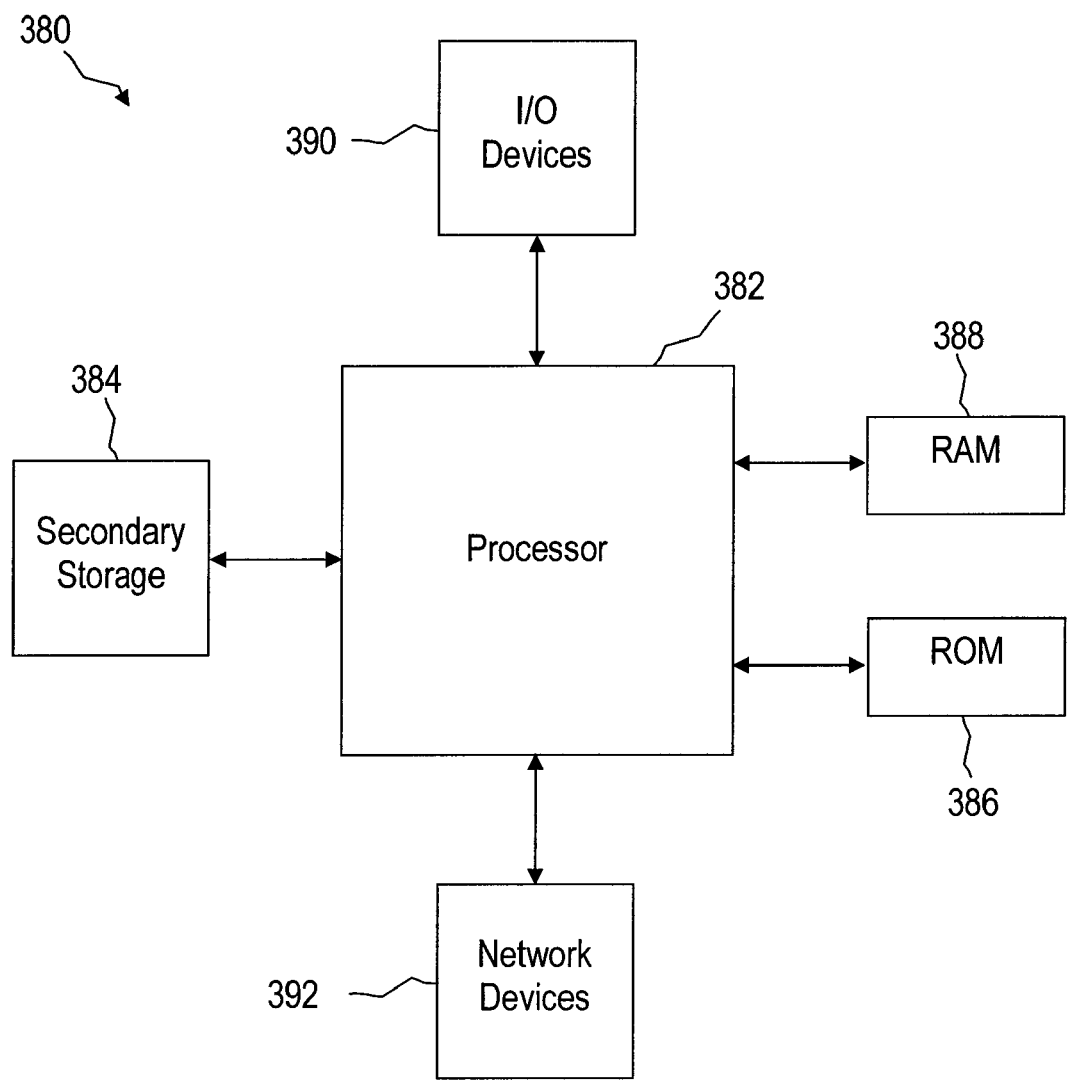
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for an in-service software upgrade, comprising:
    a processor;
    a first version of a software process;
    a second version of the software process;
    a proxy software process, when executed by the processor, to intercept a message intended for the first version of the software process and direct the message to one of the first version of the software process and the second version of the software process based on a status of a transaction associated with the message; and
    a first mapping table to associate an address of the first version of the software process with the first version of the software process prior to the in-service software upgrade, associate an address of the proxy software process with the first version of the software process during the in-service software upgrade, and associate an address of the second version of the software process with the first version of the software process after the in-service software upgrade and wherein, during the in-service software upgrade, the proxy software process directs the message to one of the address of the first version of the software process and the address of the second version of the software process.

2. The system of claim 1, wherein the status is one of an old transaction that was in progress at a time when the second version of the software process began execution and a new transaction that was begun after the time the second version of the software process began execution, and wherein the proxy software process directs the message to the first version of the software process when the transaction is an old transaction and directs the message to the second version of the software process when the transaction is a new transaction.

3. The system of claim 1, further comprising an upgrade manager to specify the address of the proxy software process and the address of the second version of the software process.

4. The system of claim 3, further comprising a second mapping table maintained by the proxy software process to include the address of the first version of the software process and the address of the second version of the software process.

5. The system of claim 4, wherein a header of the message specifies the status of the transaction and wherein the proxy software process reads the status from the header and associates one of the addresses in the second mapping table with the message based on the status.

6. The system of claim 5, further comprising:
    a first update log to record a modification to data in a first data store during the in-service software upgrade;
    a second update log to record a modification to data in a second data store during the in-service software upgrade;
    a schema definition file to specify a first schema for data in the first data store, a second schema for data in the second data store, and a rule for converting data between the first and second schemas; and
    a synchronization daemon to receive information from the first update log, the second update log, and the schema definition file and to use the information to ensure that the data in the first data store and the format of the data in the first data store are substantially similar to the data in the second data store and the format of the data in the second data store.

7. The system of claim 6, wherein the first version of the software process, the proxy software process, the upgrade manager, the second mapping table, the first update log, the second update log, the schema definition file, and the synchronization daemon are removed from the system when an old transaction has not occurred for a predefined length of time.

8. A method for upgrading software, comprising:
    executing a first version of the software and a second version of the software substantially simultaneously during an upgrade process;
    intercepting a message intended for the first version of the software using a proxy;
    directing, using the proxy, the message to the first version of the software when a transaction associated with the message is an old transaction that was in progress at a time when the second version of the software began execution and the proxy directing the message to the second version of the software when the transaction associated with the message is a new transaction that was begun after the time the second version of the software began execution;
    receiving, using a synchronization daemon, information from the first version of the software, information from the second version of the software, a first schema for information from the first version of the software, a second schema for information from the second version of the software, and at least one rule for converting information between the first and second schemas; and
    using the information, by the synchronization daemon, to ensure that the information of the first version of the software and a format of the information from the first version of the software are substantially similar to the information of the second version of the software and the format of the information from the second version of the software.

9. The method of claim 8, further comprising, during the upgrade process, modifying an address of the first version of the software to an address of the proxy.

10. The method of claim 9, further comprising, after the upgrade process, modifying an address of the first version of the software to an address of the second version of the software.

11. The method of claim 8, further comprising specifying in a message header a destination of the message and whether a status of the transaction associated with the message is one of an old transaction and a new transaction, and the proxy directing the message to one of the first version of the software and the second version of the software based on the destination and the status.

12. The method of claim 8, further comprising:
    recording, using a first update log, a modification to data in a first data store during the upgrade process;
    recording, using a second update log, a modification to data in a second data store during the upgrade process;
    receiving, using the synchronization daemon, the information of the first version of the software from the first update log, the information of the second version of the software from the second update log; and using the information, by the synchronization daemon, to ensure that the data in the first data store made the format of the data in the first data store are substantially similar to the data in the second data store and the format of the data in the second data store.

13. The method of claim 12, further comprising the proxy sending a message to an upgrade manager when an old transaction has not occurred for a predefined length of time, and the upgrade manager, upon receiving the message from the proxy, promoting the first update log and the second update log stopping to stop recording the modification to data and promoting the removal of the first version of the software, the proxy, the first update log, the second update log, the schema definition file, the synchronization daemon, and the upgrade manager.

14. A network element in a wireless telecommunications network, comprising:
   a processor;
   a first version of a software application;
   a second version of the software application, wherein the first version of the software application and the second version of the software application are executed substantially simultaneously during an upgrade process;
   a proxy software process operable, when executed by the processor, operable to intercept a message intended for the first version of the software application and, based on a status of a transaction associated with the message, operable to direct the message to one of the first version of the software application and the second version of the software application; and
   a synchronization daemon, when executed by the processor, operable to:
      receive information from the first version of the software application, information from the second version of the software application, a first schema for information from the first version of the software application, a second schema for information from the second version of the software application, and at least one rule for converting information between the first and second schemas; and
      use the information to ensure that the information from the first version of the software application and a format of the information from the first version of the software application are substantially similar to the information from the second version of the software application and the format of the information from the second version of the software application.

15. The network element of claim 14, wherein the status is one of an old transaction that was in progress at a time when the second version of the software application began execution and a new transaction that was begun after the time the second version of the software application began execution, and wherein the proxy software process directs the message to the first version of the software application when the transaction is an old transaction and directs the message to the second version of the software application when the transaction is a new transaction.

16. The network element of claim 15, wherein the old transaction and the new transaction relate to call processing of an old call or a new call.

17. The network element of claim 14, wherein a header of the message specifies a destination of the message and the status of the transaction associated with the message and wherein the proxy software process directs the message to one of the first version of the software application and the second version of the software application based on the destination and the status.

18. The network element of claim 14, further comprising:
   a first update log to record a modification to data in a first data store during the upgrade process; and
   a second update log to record a modification to data in a second data store during the upgrade process;
   wherein the synchronization daemon is configured to receive the information of the first version of the software application from the first update log, the information of the second version of the software application from the second update log, and the schema definition file, and use the information to ensure that the data in the first data store and the format of the data in the first data store are substantially similar to the data in the second data store and the format of the data in the second data store.

19. The network element of claim 14, wherein the network element is selected from a group consisting of:
   a base station controller;
   a router; and
   a switch.

* * * * *